Figure 6:
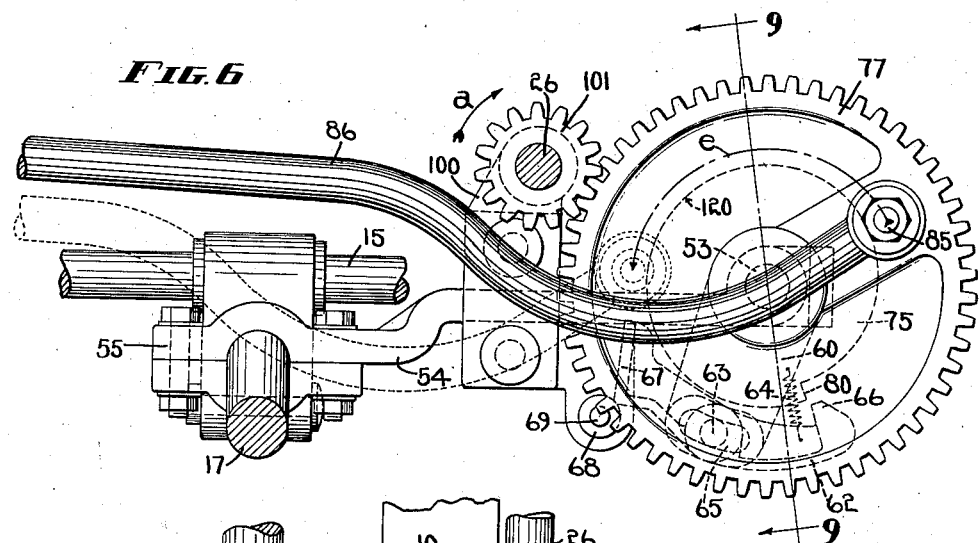

Dec. 28, 1937.  O. V. PAYNE  2,103,820
PICKING MOTION FOR LOOMS
Filed Nov. 21, 1936   3 Sheets-Sheet 1
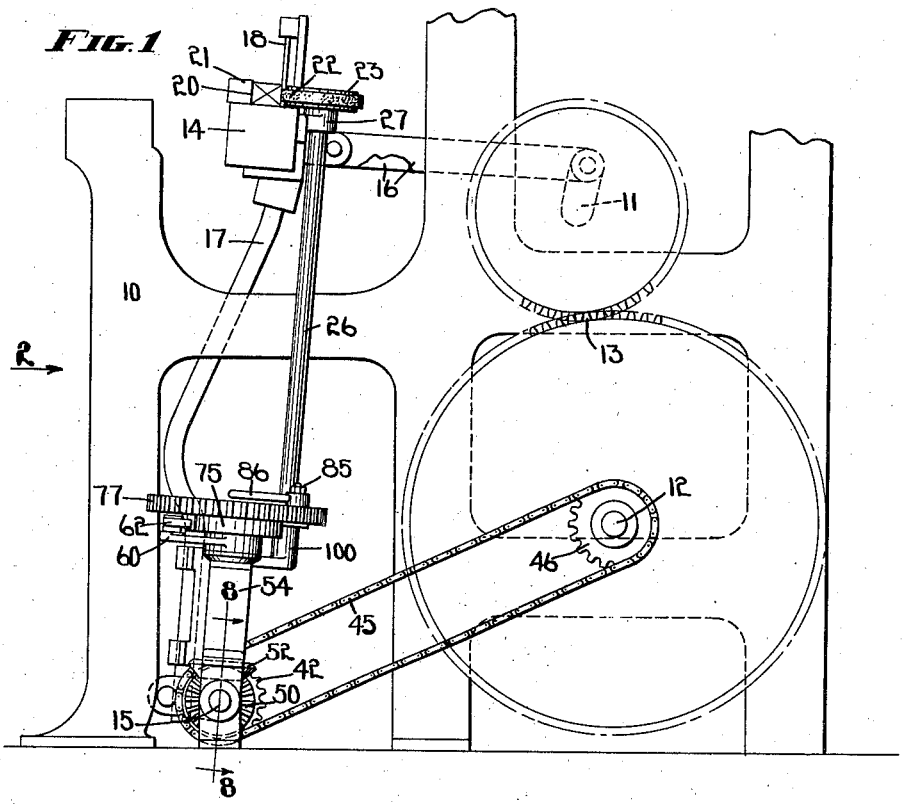
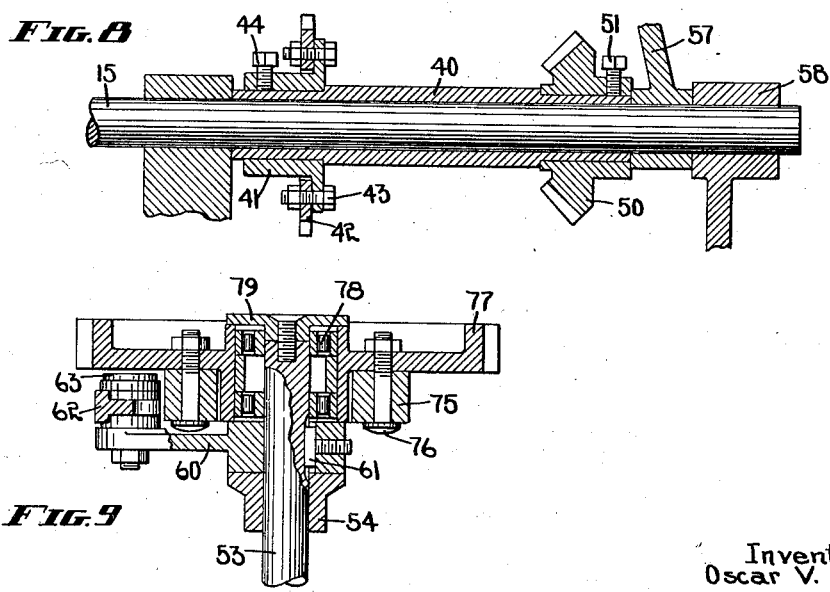
Inventor
Oscar V. Payne Dec. 28, 1937.　　　　O. V. PAYNE　　　　2,103,820
PICKING MOTION FOR LOOMS
Filed Nov. 21, 1936　　　　3 Sheets-Sheet 2
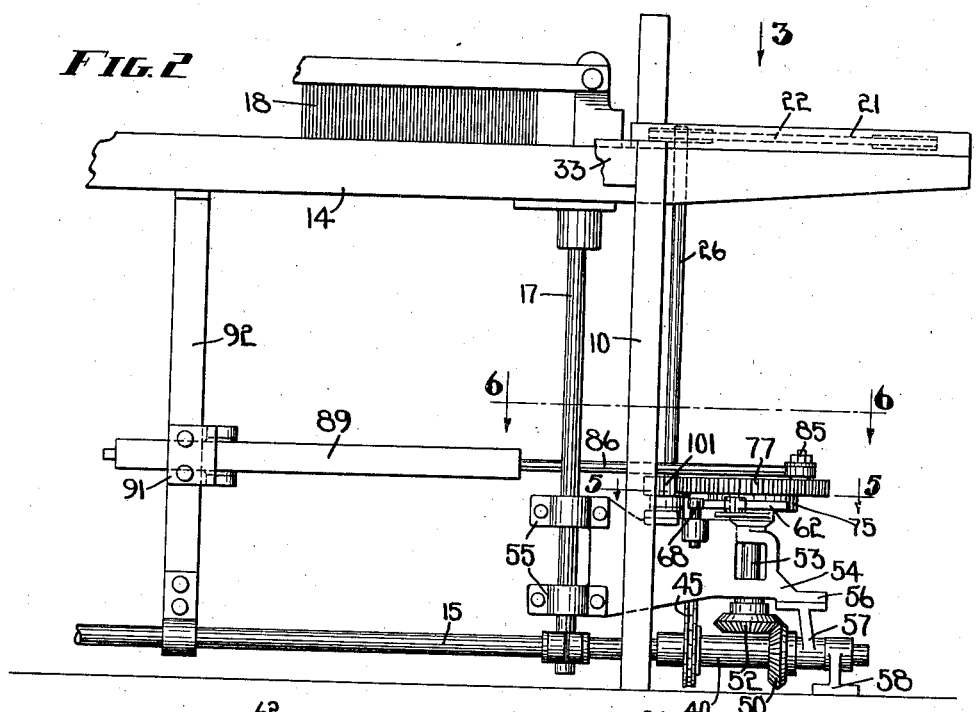
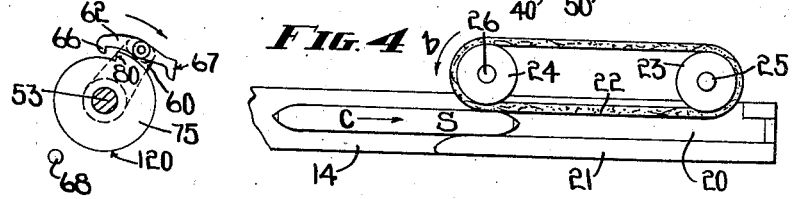
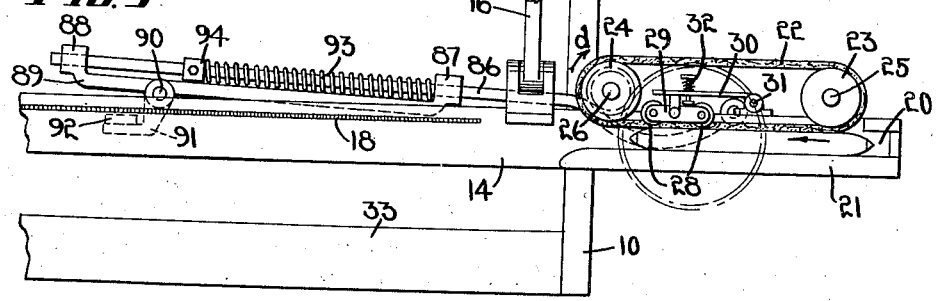
Inventor
Oscar V. Payne
Attorney Dec. 28, 1937.        O. V. PAYNE        2,103,820
PICKING MOTION FOR LOOMS
Filed Nov. 21, 1936        3 Sheets-Sheet 3

Inventor
Oscar V. Payne
Chas. R. Hawley
Attorney

Patented Dec. 28, 1937

2,103,820

UNITED STATES PATENT OFFICE 2,103,820

PICKING MOTION FOR LOOMS

Oscar V. Payne, Leicester, Mass., assignor to Crompton & Knowles Loom Works, Worcester, Mass., a corporation of Massachusetts Application November 21, 1936, Serial No. 111,996

16 Claims. (Cl. 139—145)

This invention relates to improvements in shuttle picking motions for looms and it is the general object of the invention to provide means for picking a shuttle by means of a traveling or rotating part, such as a friction belt, actuated by energy which is stored throughout a considerable part of the cycle of the loom.

In the stored energy type of picking motions heretofore proposed the spring or other resilient element has acted in such a way as to cause an abrupt stop of the shuttle actuating mechanism at the end of the picking stroke. This is due partly at least to the fact that the customary shuttle motions employ a picker moving in a straight line which precludes the possibility of cushioning the shock without the use of additional devices, such as buffer springs. In order to permit the use of stored energy of a picking motion without these disadvantages I propose to employ a rotating part the effect of which is to permit the end of the picking stroke to be approached without the abruptness characteristic of previous motions of this general character.

As shown herein the rotary element drives an endless belt having a frictional contact with the shuttle and being trained around a pulley or sheave connected to and driven by the rotary element. By such a construction the point of connection between the stored energy device and the rotary element passes a line joining the center of the rotary element and device by a motion which is progressively decreased due to the rotary motion. The said point of connection may in fact pass beyond the point corresponding to the completion of the picking stroke to cause a slight secondary compression of the spring, thereby absorbing any shock incident to the picking motion. These results are accomplished as already stated without the use of buffers or the like and grow out of the inherent nature of the motion to be set forth more particularly hereinafter.

The rotary element oscillates, moving in one direction to stress the spring and then being automatically tripped to release the spring. While the spring is being stressed the belt has a reverse motion and I make use of this fact to place the shuttle properly for picking. The friction between the shuttle and the belt can be such as to prevent the shuttle from entering fully into the box at the end of its pick, thereby preventing rebound, and reliance can be had upon the reverse motion of the belt to place the shuttle correctly prior to picking. This placing feature takes place simultaneously with the stressing of the spring and may continue until the spring is fully charged, and acts to prepare the shuttle for picking.

It is a more particular object of my invention to provide a constantly rotating actuator member and a picking element to be rotated, the member and element being periodically connected by means of a pawl or trigger to stress the spring and being automatically released by rotation of the element and member. The releasing may be accomplished by a trip or the like the position of which may be varied to afford adjustment of the time of picking relatively to the loom cycle.

With these and other objects in view which will appear as the description proceeds, my invention resides in the combination and arrangement of parts hereinafter described and set forth.

Figure 7:
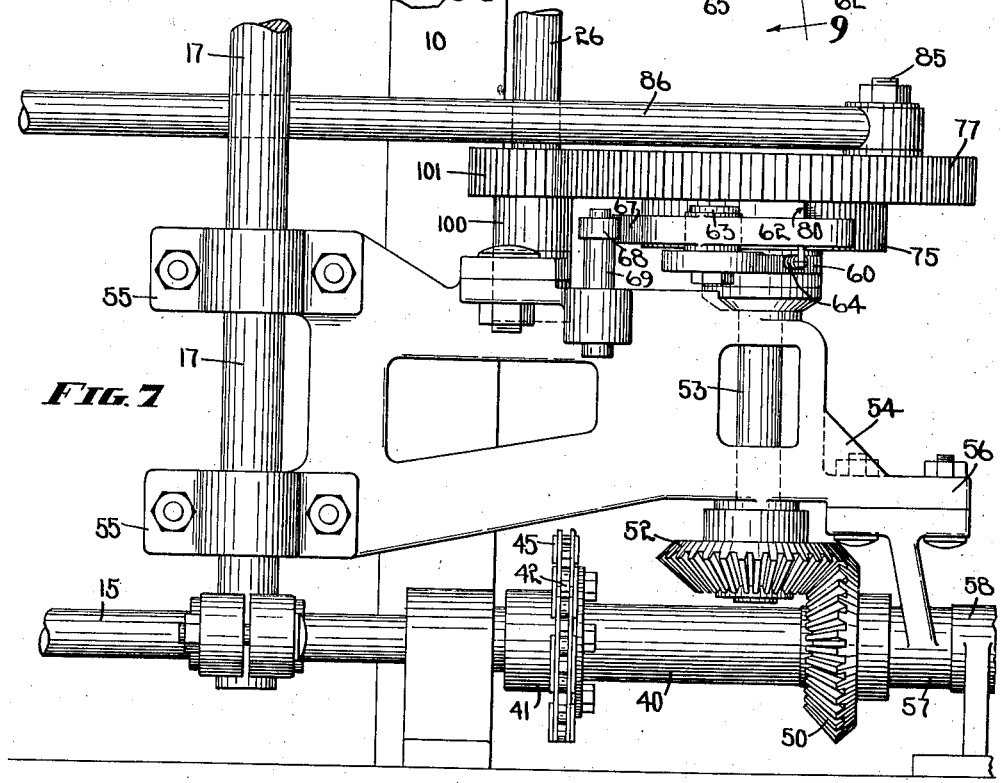

In the accompanying drawings, wherein a convenient embodiment of my invention is set forth, Fig. 1 is a side elevation of a loom having my invention applied thereto, Fig. 2 is a front elevation looking in the direction of arrow 2, Fig. 1, Fig. 3 is a detailed plan view in the direction of arrow 3, Fig. 2, Fig. 4 is a view similar to a portion of Fig. 3, but with the belt starting its reverse motion to place the shuttle for picking, Fig. 5 is a detailed horizontal section on line 5—5 of Fig. 2, but with the pawl in a different position, Fig. 6 is an enlarged horizontal section on line 6—6 of Fig. 2, Fig. 7 is an enlarged front elevation similar to the lower right hand part of Fig. 2, Fig. 8 is a vertical section on line 8—8, Fig. 1, on an enlarged scale, and Fig. 9 is a vertical section on line 9—9 of Fig. 6.

Referring to Figs. 1, 2, and 3, a loom frame 10 has top and bottom shafts 11 and 12, respectively, connected by gearing indicated at 13 and so proportioned as to give the bottom shaft one complete revolution for every two beats of the loom. A lay 14 on a rocker shaft 15 is reciprocated by means of connectors 16 driven by the top shaft. The lay is supported on swords on the rocker shaft, one being shown at 17, and is provided with the usual reed 18.

The invention is applicable to both ends of the lay, but for purposes of illustration I show it herein in connection with but one end of the loom. A shuttle box 20 to receive the shuttle S has a front wall 21, while the rear wall is defined by an endless flexible belt 22 trained around outer and inner sheaves 23 and 24, respectively. Sheave 23 is movable about a pivot 25 fixed to the lay while sheave 24 is secured to the upper end of a shaft 26 guided in a lay carried bearing 27. A pair of pressure rolls 28 are carried by a floating arm 29 pivoted to a support lever 30 pivoted to the lay at 31 and urged forwardly by a spring 32.

During operation the lay swings back and forth toward and from the breast beam 33 and the shuttle enters and leaves the box in a manner somewhat similar to that shown in my prior Patent No. 2,012,053.

In carrying my invention into effect I extend the rocker shaft 15 of the loom beyond the loom frame and mount thereon a sleeve 40 having secured thereto the hub 41 of a sprocket wheel 42 held to the hub by bolts 43. A set screw 44 holds the hub in fixed position on the sleeve. A chain 45 is trained around the sprocket and also around a second sprocket 46 secured to the bottom shaft, as shown in Fig. 1. Sprockets 42 and 46 are of the same size so that the sleeve 40 is given a complete revolution every second beat of the loom.

A bevel gear 50 is held by a set screw 51 in fixed relation on the sleeve 40 and meshes with a bevel gear 52 secured to the bottom of an upright shaft 53 journaled in a bracket 54. The bracket has two feet 55 by means of which the inner end thereof is secured to sword 17 and has also a foot 56 secured to a bearing 57 which is supported by the extension of the rocker shaft 15. An outboard bearing 58 may be provided for the rocker shaft if desired. The bracket, shaft 53, and the bevel gear 52 therefore rock back and forth with the lay, the bevel gears 50 and 52 remaining constantly in mesh with each other.

The upper end of shaft 53 has an arm 60 secured thereto by means of a key 61, see Fig. 9. A pull pawl 62 is pivoted to the arm by means of a stud 63 and a spring 64 tends normally to swing the pawl in a counterclockwise direction as viewed in Fig. 6. The stud 63 is located in a slot 65 in the arm to afford adjustment of the axis of the pawl around the shaft 53. The pawl has a hook 66 at one end while the other end has a cam 67 adapted for engagement with a fixed roll 68. The latter rotates about a stud 69 carried by the upper part of the bracket 54.

A hook plate 75 is located above the arm 60 and is held by means of bolts 76 to a relatively large spur gear 77. This gear rotates in a roller bearing designated generally at 78 on the upper end of shaft 53. A plate 79 may be used to keep the gear from improper upward displacement and said gear may rest on the arm 60, as shown in Fig. 9. Plate 75 has a shoulder 80 shown in Fig. 6 adapted for engagement with the hook 66 of the pawl. The previously described spring 64 may be attached to the plate urging the hook 66 normally to move toward the plate 75 where it will be in position to engage shoulder 80.

A stud 85 is secured to and projects upwardly from the gear 77 and is attached to the outer end of a connector 86 the inner end of which slides through spaced bearings 87 and 88 carried by a rocking frame 89 pivoted as at 90 to a stand 91 mounted on an auxiliary lay sword 92, as shown in Fig. 2. The upper end of sword 92 is attached to the lay while the lower end is supported by the rocker shaft 15. A relatively heavy compression spring 93 surrounds a part of the rod 86 and engages bearing 87 at one end thereof while the other end abuts a collar 94 adjustably secured to the rod 86. Alteration of the location of the collar 94 will vary the force exerted by the spring.

The shaft 26 has the lower end thereof journaled in a bearing 100 carried by the bracket 54 and has secured thereto a pinion 101 which meshes with the gear 77.

In operation the sleeve 40 has a complete rotation every second beat of the loom and since the bevel gears 50 and 52 are of the same size, the shaft 53 and therefore the arm 60 together with the pawl make a complete rotation in two beats of the loom.

As the arm 60 rotates the hook 66 will engage the shoulder 80 and turn both the pawl plate and the large gear 77 in a clockwise direction as viewed in Fig. 6 to cause the stud 85 to move from the dotted to the full line position of that figure. During this movement the spring 93 is compressed by movement of the rod 86 to the right, see Figs. 3 and 6, and at the same time the pinion 101 is given a reverse motion opposite to that indicated by arrow $a$ in Fig. 6. During this time the belt 22 is therefore given a reverse motion in the direction of arrow $b$, Fig. 4, so that the shuttle S will be moved into the box, or to the right from the position shown in Fig. 4, as indicated by arrow $c$. The purpose of this operation is to place the shuttle correctly for picking.

The parts are so related that when the stud 85 reaches the full line position of Fig. 6 the cam face 67 will have engaged the roll 68 and rocked the pawl in a clockwise direction, see Fig. 6, against the action of spring 64 to move the hook 66 away from the shoulder 80. This frees the spring and the latter expands by moving the collar 94 to the left as viewed in Fig. 3, thereby causing a counterclockwise rocking of gear 77 as viewed in Fig. 6 with resultant clockwise motion of the pinion 101. This rocks the shaft 26 and sheave 24 in a clockwise direction as indicated by arrow $d$, Fig. 3, and the shuttle S is moved out of the box by reason of its frictional engagement with the belt.

I find it convenient to have the hook 66 engage the shoulder 80 when the lay is moving forwardly and at some position preferably before reaching bottom center. This affords considerable time during which the loom can compress the spring. During the beat of the loom when the shuttle is on the other side the hook will slide along a dwell surface 120 of the pawl plate.

By an inspection of Fig. 6 it will be seen that as the stud 85 approaches the dotted line position the longitudinal motion of the rod 86 decreases due to the fact that the stud is approaching a line joining shaft 53 and the frame 89. The momentum of the gear 77 and the plate 75 may tend to cause shaft 26 to rotate slightly farther than is necessary to complete the pick, but as soon as stud 85 passes the aforesaid line the spring will be compressed and serve to check any further motion of the gear and shaft.

The frame 89 rocks to accommodate the changing position of stud 85 as the gear 77 turns about the axis of shaft 53. The gear 77 is considerably larger than the pinion 101, and the latter preferably smaller than the sheave 24, hence there is a considerable multiplication of the angular motion of the gear 77, and I have found in practice that the amount of turning of gear 77 indicated by the dot and dash arrow $e$, Fig. 6, is sufficient to turn the sheave 24 enough to cause a considerable travel of the belt.

From the foregoing it will be seen that I have provided a picking motion for looms wherein a spring is stressed to supply the picking energy, together with mechanism to apply that energy to the shuttle including a rotary element connected to the spring. As a result of this relation the end of the picking stroke is reached without shock. Furthermore, any tendency of the gear 77 to overrun because of its momentum will be arrested by a corresponding compression of the spring which will resist the overrunning and return the gear to its normal position. The spring acts to hold the gear 77 with the stud 85 in the dotted line position shown in Fig. 6 and the adjustment afforded by slot 65 permits a variation not only in the time when the compressing of the spring will start but also the releasing time when the pawl is moved away from the shoulder 80. Also, it will be seen that the compressing of the spring which is necessary before the pick occurs coincidentally with the placing of the shuttle. While I have shown a belt to apply friction to the shuttle for the purpose of picking, yet I do not wish to be limited to a belt.

Having thus described my invention it will be seen that changes and modifications may be made therein by those skilled in the art without departing from the spirit and scope of the invention and I do not wish to be limited to the details herein disclosed, but what I claim is:

1. In a loom having a lay and operating with a shuttle, an endless belt having a portion movable longitudinally along the lay in frictional contact with a side of the shuttle to pick the latter, a rotary element to drive the belt, a spring connected to the element and effective to cause angular movement of the latter to drive that part of the belt in frictional contact with the shuttle longitudinally along the lay in a direction to pick the shuttle by a force transmitted through the friction surface, and means to reverse the rotary element to restore the belt to position for another pick and also store energy in the spring.

2. In a loom having a lay and operating with a shuttle, an endless belt on the lay having a portion movable longitudinally therealong in frictional contact with a side of the shuttle to pick the latter, a rotary element to drive the belt, a spring, means connecting the spring to the element to render said spring capable of causing angular motion of the element to drive that part of the belt in frictional contact with the shuttle longitudinally along the lay in a direction to pick the shuttle by a force transmitted through the friction surface, and means to reverse the rotary element to restore the belt to position for another pick and also store energy in the spring.

3. In a loom having a lay and operating with a shuttle, a belt having a portion movable longitudinally along the lay in frictional contact with a side of the shuttle to pick the latter, a rotatable element to drive the belt, a spring connected to the rotatable element, an actuator, and means alternately to connect and disconnect the actuator to and from the element first to stress the spring and then release the same to cause motion of that part of the belt in frictional contact with the shuttle longitudinally along the lay in a direction to pick the shuttle by a force transmitted through the friction surface.

4. In a loom having a lay and operating with a shuttle, a belt mounted on the lay to pick the shuttle, a rotatable element to drive the belt, a spring actuated member permanently connected to the element, an actuator, means to couple the actuator and element to stress the spring, and uncoupling means to act on the first named means to disconnect the actuator from the element, the spring actuator member thereupon giving the element a reverse motion to move the belt and pick the shuttle.

5. In a loom having a lay and operating with a shuttle, an endless belt carried by the lay to pick the shuttle by a movement along the lay when in frictional contact with the shuttle, a rotary element to drive the belt, a spring connected to the element, means operative prior to the time of picking to move the element in a direction to stress the spring, and other means operative at the time of picking to act with the first named means to disconnect the latter from the element, whereupon the spring will cause a reverse motion of the element to move the belt and pick the shuttle.

6. In a loom having a lay and operating with a shuttle, an endless belt on the lay movable therealong in frictional contact with the shuttle to pick the latter, a rotary element to drive the belt, a spring connected to the element, mechanism to turn the element positively to stress the spring, and means to disconnect the mechanism from the element after the spring is stressed to render the spring operative to turn the element in a reverse direction to drive the belt and pick the shuttle.

7. In a loom having a lay and operating with a shuttle, an endless belt on the lay movable therealong in frictional contact with the shuttle to pick the latter, a rotary element to drive the belt, a spring connected to the element, a rotatable actuator driven in timed relation with movements of the lay, mechanism to connect the actuator and element during the portion of a loom cycle prior to picking to move the element in a direction to stress the spring, and means operative at the time of picking to act on the mechanism and disconnect the actuator from the element, the spring thereupon giving the element a reverse direction to drive the belt and pick the shuttle.

8. In a loom having a lay and operating with a shuttle, means on the lay presenting a friction surface movable longitudinally along the lay while in engagement with a side of the shuttle to pick the latter, a rotatable element to drive the movable means, a resilient member, and means connecting the resilient member and rotary element to render said resilient element capable of causing angular motion of the rotatable element to drive the latter and cause said surface to move longitudinally along the lay to pick the shuttle by a force transmitted through the friction surface.

9. In a loom having a lay and operating with a shuttle, a shuttle actuating belt movable in opposite directions along the lay to place and pick the shuttle, a spring, means connecting the spring and belt, means to stress the spring and simultaneously give the belt a shuttle placing movement along the lay, and means thereafter to release the spring to render the latter operative to give the belt a shuttle picking motion along the lay.

10. In a loom having a lay and operating with a shuttle, a belt on the lay capable of moving in opposite directions along the lay to place and pick the shuttle, a rotary element to drive the belt, a spring connected to the element, means to stress the spring and simultaneously turn the element in a direction to cause the belt to move in a shuttle placing direction along the lay, and means thereafter to release the spring, whereupon the latter causes a reverse motion of the element to cause the belt to move in a shuttle picking direction along the lay.

11. In a loom having a lay and operating with a shuttle, a rotatable element movable angularly in opposite directions, a spring connected to the element, a shuttle actuating belt driven by the element and movable in opposite directions along the lay to place and pick the shuttle, mechanism to move the element angularly in one direction to stress the spring and give the belt a shuttle placing motion, and means thereafter effective to disconnect the mechanism from the element, whereupon the spring will give the element an angular motion in the opposite direction and cause said element to impart motion to the belt in a direction to pick the shuttle.

12. In a loom having a lay and operating with a shuttle, a belt on the lay movable in opposite directions to place and pick the shuttle, a spring, mechanism to stress the spring and at the same time move the belt in a direction to place a shuttle for picking, and means to disconnect the mechanism from the spring to render the latter operative to move the belt along the lay in a direction to pick the shuttle.

13. In a loom having a lay and operating with a shuttle, an endless belt on the lay to pick the shuttle, a shaft moving with the lay and rotatable to impart motion to the belt, a gear secured to the shaft, a second gear meshing with the first gear, a spring connected to the second gear, means to turn the second gear in one direction to stress the spring, and means to disconnect the first means from the second gear, whereupon the spring is effective to move the second gear in a reverse direction to cause rotation of the shaft and movement of the belt in a direction to pick the shuttle.

14. In a loom having a lay and operating with a shuttle, an endless belt to pick the shuttle, a sheave to move the belt, a shaft secured to the sheave, a pinion secured to the shaft, a driving gear meshing with the pinion, an actuator rotatable concentrically with the gear, a spring connected to the gear, and means to couple the actuator and gear prior to picking to stress the spring and thereafter disconnect the actuator from the gear, whereupon the gear will be moved by the spring to cause rotation of the shaft and sheave and effect picking of the shuttle by the belt.

15. In a loom having a lay and operating with a shuttle, picking means to move the shuttle along the lay, a spring to be alternately stressed and released, a rotatable element connected to and having driving relation with the picking means, and attaching means to connect the spring to the element, the spring effective to cause angular motion of the element and render the latter capable of actuating the picking means, said spring moving the attaching means to a position between the axis of the element and the spring, and said element capable of having an overthrow motion to cause stressing of the spring and thereby check said overthrow motion of the element.

16. In a loom having a lay and operating with a shuttle, picking means on the lay to pick the shuttle, a rotatable element having driving connection with the picking means, a spring, means defining a point of connection between the spring and the element, the spring effective to communicate its force to the element through said point of connection and cause angular motion of the element to operate the picking means, said point of connection moving to a position between the axis of the element and the spring when the latter is unstressed, the momentum of the element moving said point of connection beyond said position to cause stressing of the spring, the effect of which is to arrest the momentum of the element.

OSCAR V. PAYNE.